United States Patent
Furukawa

(10) Patent No.: US 7,027,916 B2
(45) Date of Patent: Apr. 11, 2006

(54) METHOD OF FORMATTING NAVIGATION INFORMATION WITH VARYING LEVELS OF DETAIL

(75) Inventor: Hideo Furukawa, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/848,577

(22) Filed: May 19, 2004

(65) Prior Publication Data

US 2005/0137787 A1    Jun. 23, 2005

Related U.S. Application Data

(60) Provisional application No. 60/531,664, filed on Dec. 23, 2003.

(51) Int. Cl.
   *G06F 165/00* (2006.01)
   *G06F 17/30* (2006.01)
   *G06G 7/78* (2006.01)

(52) U.S. Cl. .................. 701/201; 701/206; 344/988

(58) Field of Classification Search ............... 701/201, 701/206, 208, 209, 214, 200, 207, 212; 340/988; 73/178 R
See application file for complete search history.

(56) References Cited

U.S. PATENT DOCUMENTS

| | | | |
|---|---|---|---|
| 5,168,452 A * | 12/1992 | Yamada et al. ............ 701/202 |
| 5,187,810 A | 2/1993 | Yoneyama et al. | |
| 5,191,532 A | 3/1993 | Moroto et al. | |
| 5,513,110 A * | 4/1996 | Fujita et al. ............... 701/207 |
| 5,845,228 A * | 12/1998 | Uekawa et al. ............ 701/209 |
| 5,899,955 A * | 5/1999 | Yagyu et al. ............... 701/209 |
| 5,987,381 A | 11/1999 | Oshizawa | |
| 6,181,987 B1 | 1/2001 | Deker et al. | |
| 6,292,743 B1 | 9/2001 | Pu et al. | |
| 6,343,301 B1 * | 1/2002 | Halt et al. ................. 707/203 |
| 6,351,708 B1 | 2/2002 | Takagi et al. | |
| 6,356,836 B1 | 3/2002 | Adolph | |
| 6,374,177 B1 | 4/2002 | Lee et al. | |
| 6,381,535 B1 | 4/2002 | Durocher et al. | |
| 6,507,850 B1 * | 1/2003 | Livshutz et al. .......... 707/104.1 |
| 6,691,028 B1 | 2/2004 | Bullock et al. | |
| 6,691,128 B1 | 2/2004 | Natesan et al. | |
| 6,738,711 B1 | 5/2004 | Ohmura et al. | |
| 6,917,878 B1 | 7/2005 | Pechatnikov et al. | |
| 2002/0128768 A1 | 9/2002 | Nakano et al. | |
| 2003/0046331 A1 | 3/2003 | O'Donnell | |
| 2004/0093155 A1 | 5/2004 | Simonds et al. | |

* cited by examiner

*Primary Examiner*—Thomas G. Black
*Assistant Examiner*—Dalena Tran
(74) *Attorney, Agent, or Firm*—Plumsea Law Group, LLC; Mark E. Duell

(57) ABSTRACT

A method of formatting navigation information is disclosed. The method can establish various different regions on a map. These regions can include varying levels of detail. Some of the regions can include more details than other regions. The regions can have different shapes and sizes, and in some cases, the regions can follow a route. Regions can also be established for end points.

35 Claims, 11 Drawing Sheets

Figure 7
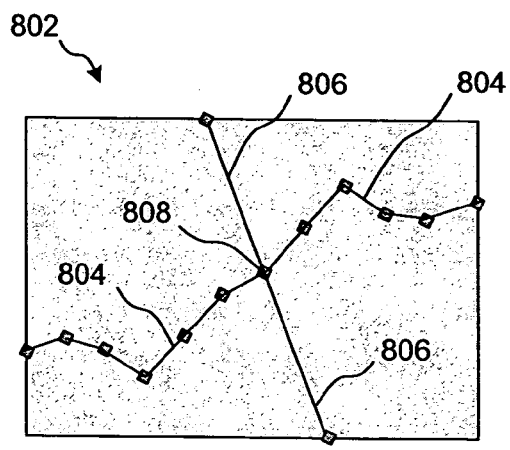
Figure 8
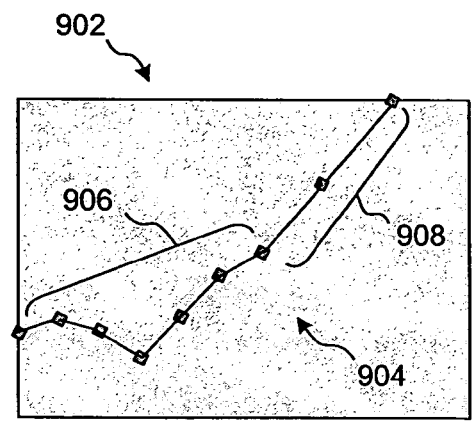
Figure 9

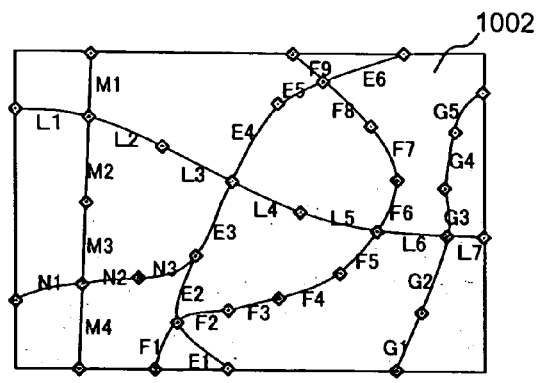
Figure 10
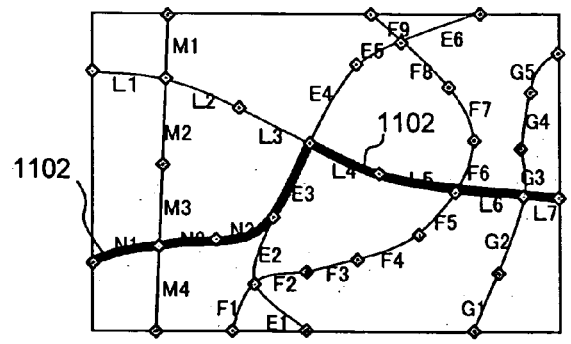
Figure 11
Figure 12
Figure 13
Figure 14

METHOD OF FORMATTING NAVIGATION INFORMATION WITH VARYING LEVELS OF DETAIL

CROSS REFERENCE TO RELATED APPLICATIONS

This application claims the benefit of U.S. Provisional Patent Application No. 60/531,664, filed on Dec. 23, 2003. This Provisional Patent Application is hereby incorporated by reference in its entirety.

BACKGROUND

1. Field of the Invention

This invention relates to the field of navigation, and more particularly, to a system and method for managing navigation information.

2. Related Art

Currently, some motor vehicles include provisions for providing navigation information and driving directions to the driver. These navigation systems generally comprise a system that is built into a motor vehicle. These systems are usually designed so that, after leaving the factory, the systems are self-contained units. And all of the navigation information that is available to direct a driver to a particular destination is contained within the system.

All of this information usually requires considerable computer resources to store, search and manage all of the data. Large storage capacity, fast processors, large amounts of memory and other costly computer equipment are all required to manage and process all of the navigation equipment.

While this arrangement does provide navigation assistance, there are a number of drawbacks. First, current systems are expensive. In many cases, current navigation systems can significantly increase the cost of purchasing a motor vehicle. Also, updating the system is cumbersome and expensive.

Some systems are incapable of receiving updates. For systems, all of the navigation information initially programmed is all that is ever available. These systems cannot assist users in finding a destination that is located on a new street or new development. Some systems are updated by installing or replacing a new storage medium. In some cases, a high capacity storage medium like an optical disk, for example a CD or DVD-ROM, is inserted. In some other cases, a new optical disk containing updates replaces the existing optical disk. While these systems are capable of receiving updates, providing these new optical disks is expensive and cumbersome. The proprietor must produce and create a new optical disk with the updated information and distribute the optical disk. Users must purchase or obtain the disk and install the updated information. Because of the cost and inconvenience associated with this process, updates practical are only about once a year.

There is currently a need for a system that is less expensive and can be easily updated. There is also a need for a system that can deliver navigation information using existing infrastructure and can deliver navigation information in real time.

SUMMARY

A method of formatting navigation information is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a method for preparing navigation information comprising the following steps: receiving a request for navigation information, gathering information related to a route between a starting point and a destination point, establishing a first region having a first level of detail, establishing a second region having a second level of detail, where the first level of detail is different than the second level of detail.

In another aspect, the first level of detail is greater than the second level of detail.

In another aspect, a third region is established, the third region having a third level of detail different than the first level of detail and the second level of detail.

In another aspect, the third level of detail is less than the second level of detail.

In another aspect, the third level of detail omits all details.

In another aspect, the first level of detail includes all available details.

In another aspect, the first region is established proximate the route.

In another aspect, the invention provides a method for preparing navigation information comprising the following steps: receiving a request for navigation information, gathering information related to a route between a starting point and a destination point, establishing a route first region associated with the route, having a first level of detail, and having a portion extending a first distance from the route, establishing an end point first region associated with an end point, having the first level of detail, and extending a second distance from the end point; and where the first distance is less than the second distance.

In another aspect, the end point is a starting point.

In another aspect, the end point is a destination point.

In another aspect, the end point first region includes a second portion, the second portion extending a third distance from the end point, and wherein the first distance is less than the third distance.

In another aspect, the end point first region includes a second portion, the second portion extending a third distance from the end point, and wherein the first distance is greater than the third distance.

In another aspect, the first portion is established proximate the route.

In another aspect, the invention provides a method for preparing navigation information comprising the following steps: establishing a first region, a second region and a third region, where the first region includes more detailed navigation information than the second region and where the second region includes more detailed navigation information than the third region; and where a route is located closer to the first region than the second region.

In another aspect, the first region is disposed outward of the route.

In another aspect, the first region surrounds the route.

In another aspect, the second region is disposed outward of the first region.

In another aspect, the second region surrounds the first region.

In another aspect, the third region is disposed outward of the second region.

In another aspect, the third region surrounds the second region.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is a schematic diagram of a preferred embodiment of a map with regions.

FIG. 8 is a schematic diagram of a preferred embodiment of a map with map features.

FIG. 9 is a schematic diagram of a preferred embodiment of a map with map features.

FIG. 10 is a schematic diagram of a preferred embodiment of an example map.

FIG. 11 is a schematic diagram of a preferred embodiment of an example map with an example route.

FIG. 12 is a schematic diagram of a preferred embodiment of map information.

FIG. 13 is a schematic diagram of a preferred embodiment of route information.

FIG. 14 is a schematic diagram of a preferred embodiment of map and route information.

DETAILED DESCRIPTION OF THE PREFERRED EMBODIMENT(S)

Figure 1:
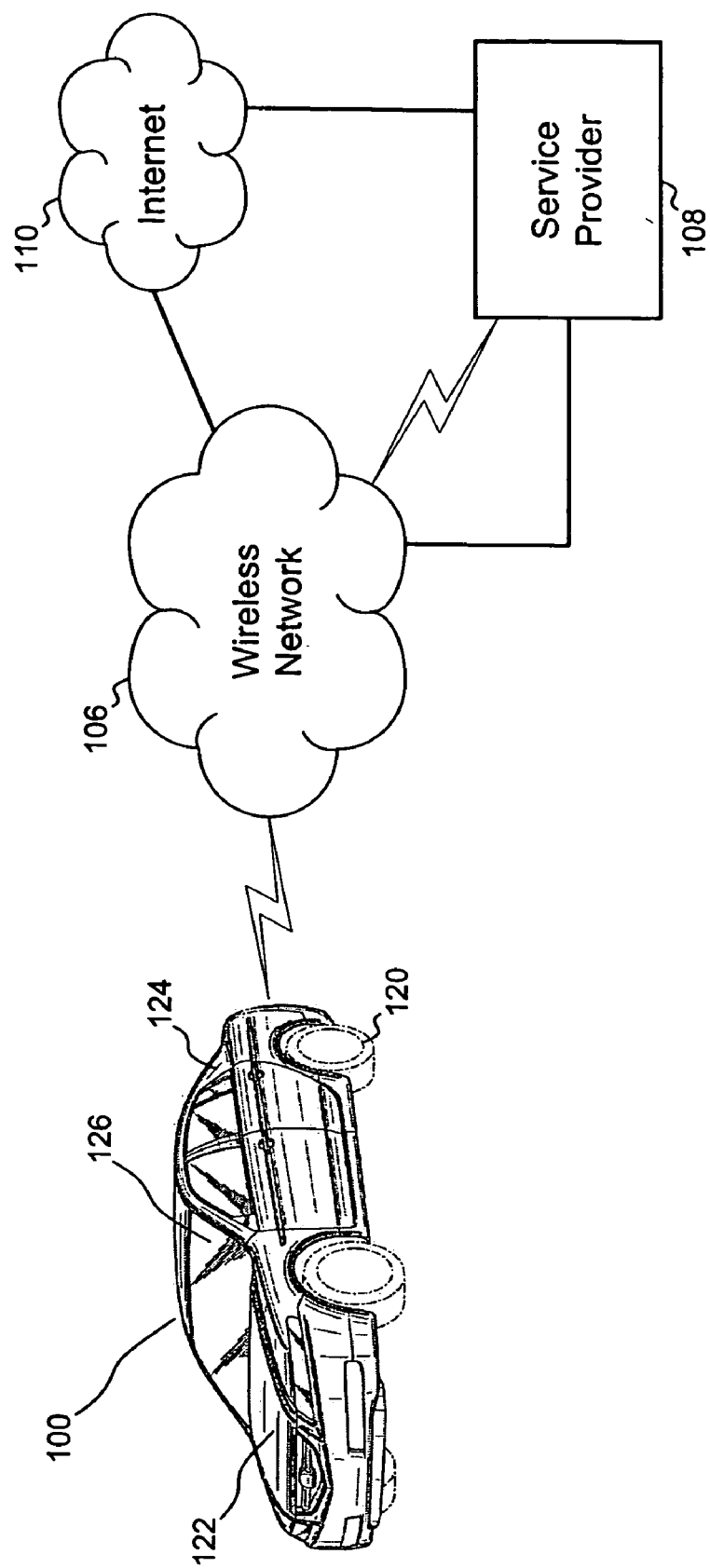
FIG. 1 is a schematic diagram of a preferred embodiment of a vehicle in association with a wireless communication system and a service provider.

FIG. 1 is a schematic view of an illustrative embodiment of a motor vehicle 100 along with various communications and computer resources, including a wireless communications network 106. Wireless network 106 can be any kind of wireless network, including but limited to any cellular telephone network using, for example, any one of the following standards: CDMA, TDMA, GSM, AMPS, PCS, analog, and/or W-CDMA.

In some embodiments, a service provider 108 communicates with motor vehicle 100. A wireless network 106 can be used facilitate communications between service provider 108 and motor vehicle 100. Service provider 108 can communicate with wireless network 106 in a number of different ways. In some embodiments, service provider 108 communicates with wireless network 106 wirelessly. In other embodiments, service provider 108 is directly connected to one or more elements of wireless network 106, and in still other embodiments, service provider 108 communicates with wireless network 106 by using the Internet 110. In some embodiments, service provider 108 can use more than one method of communicating with wireless network 106 or use other methods as back-ups.

Motor vehicle 100 also includes at least one wheel 120 adapted to contact a road surface, an engine 122, a body or chassis 124 and a passenger cabin 126, which is adapted to accommodate at least one human passenger.

Figure 2:
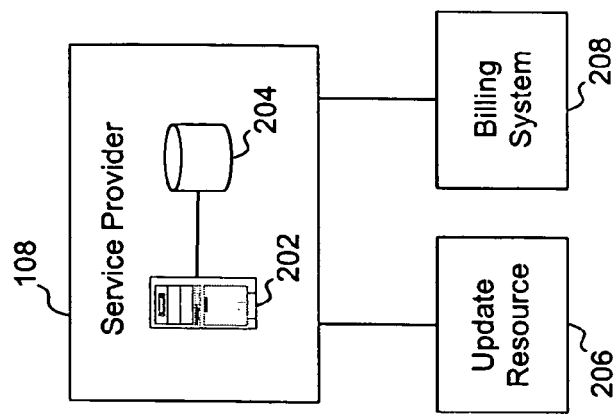
FIG. 2 is a schematic diagram of a preferred embodiment of a service provider in association with an update resource and a billing system.

FIG. 2 is a schematic diagram of a preferred embodiment of a service provider 108. In some embodiments, service provider 108 can include a computer system 202 and a database 204 in communication with computer system 202. The term "computer system" refers to the computing resources of a single computer, a portion of the computing resources of a single computer, and/or two or more computers in communication with one another, also any of these resources can be operated by one or more human users. In a preferred embodiment, computer system 202 includes a server.

Computer system 202 preferably communicates with database 204. Database 204 can include any kind of storage device, including but not limited magnetic, optical, magneto-optical, and/or memory, including volatile memory and non-volatile memory. In some embodiments, database 204 is integral with computer system 202 and in other embodiments, database 204 is separate from computer system 202 and communicates with computer system 202. In some embodiments, database 204 is used to store navigation information.

The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

In some embodiments, an update resource 206 is in communication with service provider 108. Update resource 206 can provide updates, revisions, edits and other modifications to service provider 108. In some cases, update resource 206 provides updated navigation information. In some embodiments, update resource 206 provides automated updates. In some embodiments, update resource provides periodic updates.

Some embodiments include a billing system 208 in communication with service provider 108. Billing system 208 can include account information for users and can interact with service provider 108 to prepare and generate bills. Billing system 208 can provide electronic billing or traditional billing by mail. In some embodiments, billing system 208 is a part of service provider 108 and billing system 208 uses resources associated with service provider 108. In other embodiments, billing system 208 is separate from service provider 108 and communicates with service provider 108.

Billing system 208 can interact with service provider 108 in a number of different ways. In some embodiments, billing system 208 operates on a transactional basis. In this mode, billing system 208 keeps track of a subscriber's use of service provider 108. In some cases, billing system 208 tracks or stores particular transactions or events associated with those transactions. For example, in one embodiment, billing system 208 tracks or stores requests for navigation information. These requests for navigation information can be related to a particular transaction, and billing system 208 can use these requests to track or store information related to the transaction. Billing system 208 can associate those requests with a subscriber and create a bill entry.

In some embodiments, billing system 208 tracks or stores the length of time a subscriber uses or interacts with service provider 108. In this embodiment, billing system 108 tracks or stores how long a subscriber uses are interacts with service provider 108. In some cases, a discreet measure of time, for example, a minute or any fraction or multiple, can be used to record or track a subscriber's use or interaction with service provider 108. This measure of time can be used to compute a fee and prepare a bill entry.

In some embodiments, subscribers are permitted to use or interact with service provider 108 any number of times for a set duration. For example, it is possible for subscribers to have weekly, monthly, quarterly or annual agreements with service provider 108 so that, during those agreed to periods, subscribers can use or interact with service provider 108 as often as they choose. Other durations of time can also be established. In some of these cases, subscribers have unlimited access to service provider 108 for that pre-selected duration of time. In other cases, subscribers have certain unlimited basic usage rights for that duration of time, but must pay additional fees for premium services.

One or more of the different types of billing arrangements can be used for a particular subscriber. It is also possible to provide one type of billing arrangement to one subscriber while providing a different billing arrangement to another subscriber.

Billing system 208 and service provider 108 can communicate with one another to manage subscriber access and to assist in preparing bills to subscribers. In some embodiments, billing system 208 can retrieve information from service provider 108 to create bill entries or entire bills. However, it is also possible for service provider to send information to billing system 208 related to a subscriber's activities so that billing system 208 can create bill entries or entire bills.

In some cases, service provider 108 will request information or permission from billing system 208 before preparing navigation information. In these cases, service provider 108 sends a request for permission to billing system 208 after a request for navigation information has been received from a subscriber. After receiving the request for permission from service provider 108, billing system 208 can determine if the subscriber has a valid account. In some cases, a valid account is an account that is not overdue, an account that has been pre-paid, or an account with an associated credit card. If the account is valid for some reason, billing system 208 provides permission to service provider or can inform service provider 108 that the subscriber's account is valid. After receiving permission, service provider 108 continues to process the subscriber's request and eventually respond to the subscriber.

Either or both service provider 108 or billing system 208 can use a number of different techniques to insure that the proper party is billed for various transactions. In one embodiment, information related to an On-Board Unit (disclosed below) is used to associate a particular transaction, interaction or subscription with a particular account. In another embodiment, information related to a wireless network is used to associate a particular transaction, interaction or subscription with a particular account. Some examples of information related to a wireless network include the following: Mobile Identification Number (MIN), calling party's number, Electronic or Equipment Identifier (EID), and/or Electronic Serial Number (ESN).

Figure 3:
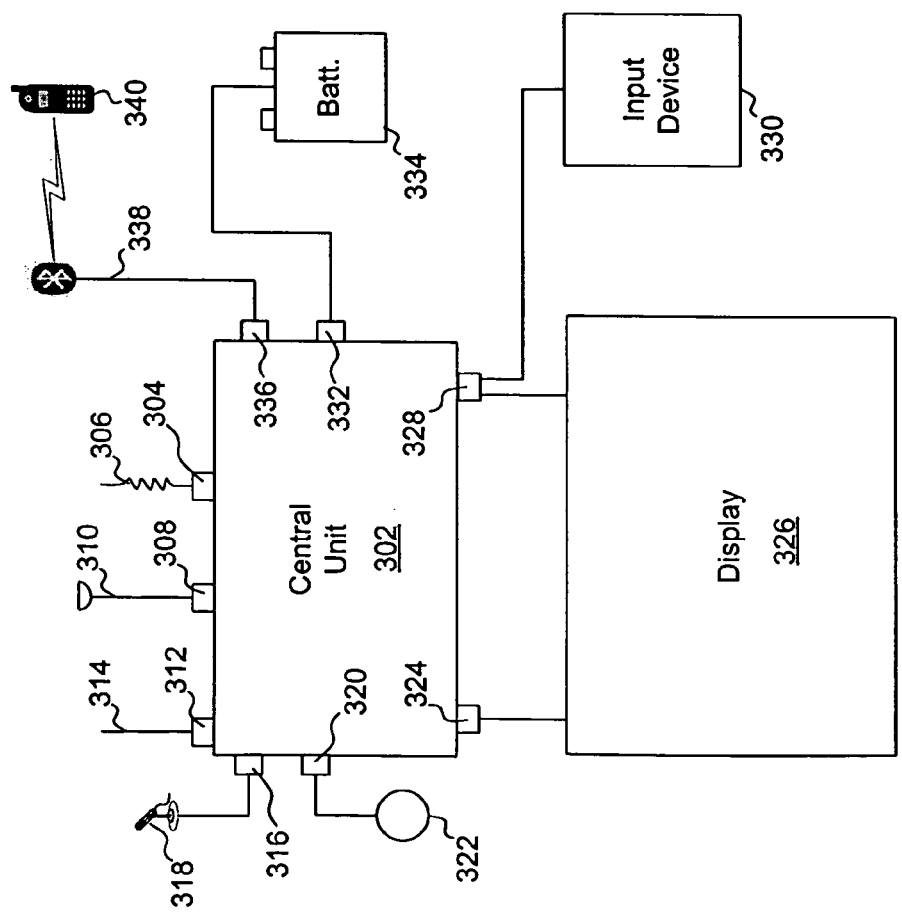
FIG. 3 is a schematic diagram of a preferred embodiment of a central unit and associated components.

FIG. 3 is a schematic diagram of several devices that are associated with motor vehicle 100. Central unit 302 can include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with central unit 302 are optional. Some embodiments may include a given port or associated provision, while others may exclude it. The following description discloses many of the possible parts and provisions that can be used, however, it should be kept in mind that not every part or provision must be used in a given embodiment. Central unit 302 includes a wireless network antenna port 304 that is designed to receive information from a wireless network antenna 306, a GPS antenna port 308 designed to receive information from a GPS antenna 310, a radio antenna port 312 designed to receive information from a radio antenna 314.

Central unit 302 can also include a number of items that facilitate human interaction. To receive vocal information from a user, central unit 302 can include a microphone port 316 that is capable of communicating with a microphone 318. Central unit 302 can also include an audio port 320 that is designed to send audio information to one or more speakers 322 or audio devices. In some embodiments, microphone port 312 and audio port 316 are conductors associated with a single physical connector. For example, microphone port 312 and audio port 316 can be female conductors of a multi-channel coaxial plug, like a standard 2.5 mm headset plug.

In order to provide visual information to a user, central unit 302 can include a display port 324 that is capable of interacting with a display device 326. To receive input from a user, central unit 302 can include an input port 328. Input port 328 can communicate with input device 330. In some embodiments, display device 326 can also receive input from a user. In some embodiments, display device 326 includes a touch screen that can receive input and in other embodiments, display device 326 includes a number of buttons that can receive input. In some embodiments, display device 326 includes both a touch screen and buttons. As shown in FIG. 3, user input received by display device 326 can also communicate with input port 328.

A power port 332 can connect central unit 302 to a power supply 334. In the embodiment shown in FIG. 3, power supply 334 is a battery.

Central unit 302 can also include provisions to communicate with a wireless telephone. Any system can be used to facilitate this communication with a wireless telephone; however, a low power radio frequency system is preferred. In an exemplary embodiment, a wireless local or personal area network using the Bluetooth® protocol is used to facilitate communication with a wireless telephone. In the exemplary embodiment shown in FIG. 3, central unit 302 includes a local wireless network antenna port 336 that is designed to communicate with a local wireless network antenna 338, which in turn, is designed to communicate wirelessly with wireless telephone 340.

Referring to FIGS. 1 and 3, there are two ways in which central unit 302 can communicate with wireless network 106. In some embodiments, central unit 302 includes provisions that permit central unit 302 to act as a wireless telephone. In these embodiments, central unit 302 communicates directly with wireless network 106 and can use wireless network antenna port 304 and wireless network antenna 306 to assist with this communication. In other embodiments, central unit 302 communicates with wireless telephone 340, which in turn, communicates with wireless network 106. In these other embodiments, central unit 302 can use local wireless antenna port 336 and associated local wireless network antenna 338 to assist in facilitating communications with wireless telephone 340. One or both of these methods can be used by central unit 302 to communicate with wireless network 106.

Central unit 302 can also include memory, data storage provisions including one or more databases and/or one or more processors.

In some embodiments, all or most of the items shown in FIG. 3 are housed in a single case or unit. In other embodiments, the various items shown in FIG. 3 are not housed in a single physical case, but instead, are distributed throughout motor vehicle 100 (see FIG. 1) and communicate with one another via known wired or wireless methods. For example, in a system where one or more items communicate wirelessly, the Bluetooth® protocol can be used.

Figure 4:
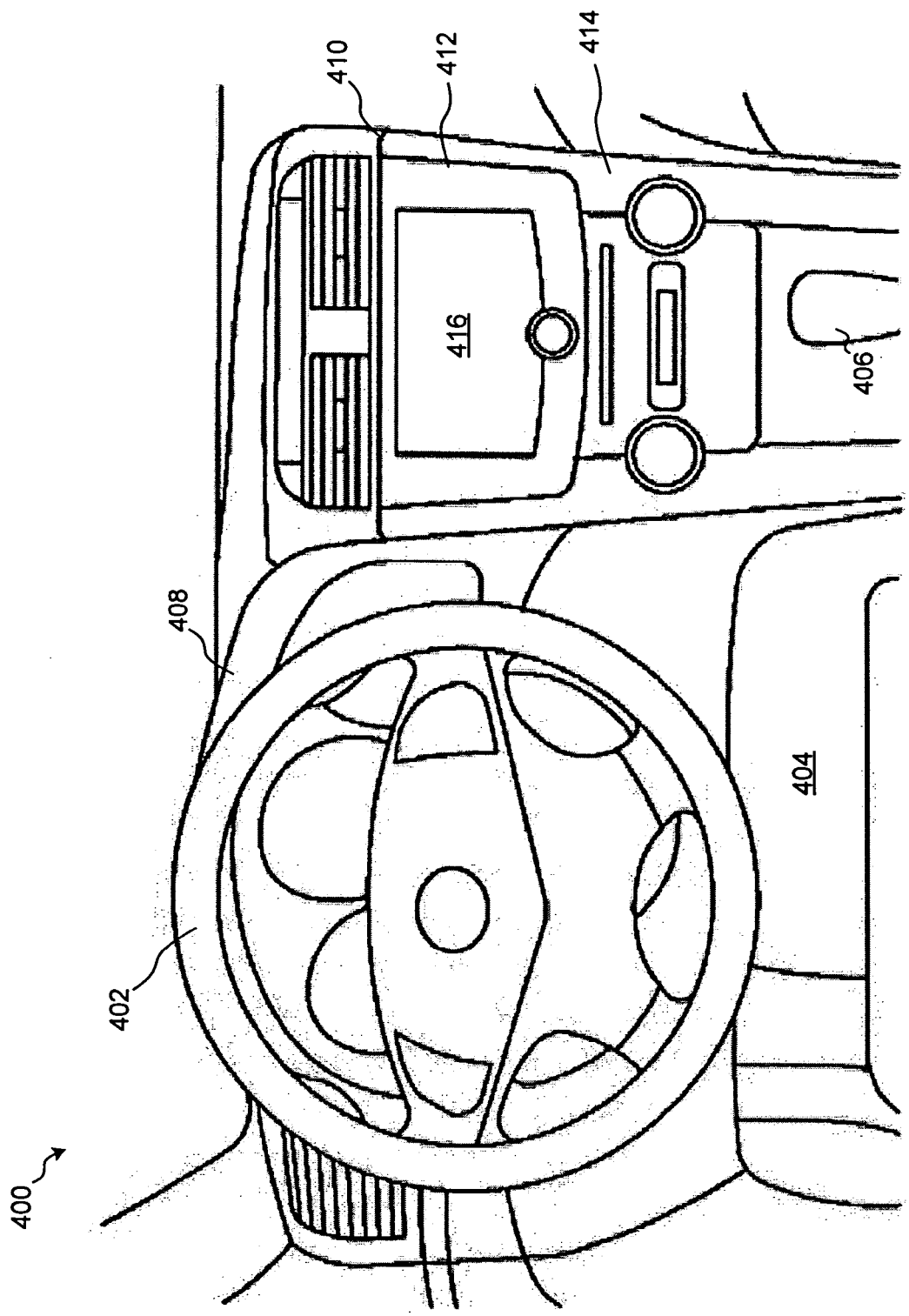
FIG. 4 is a schematic diagram of the interior of the vehicle shown in FIG. 1.

FIG. 4 is a preferred embodiment of an interior 400 of passenger cabin 126 of motor vehicle 100 (see FIG. 1). Interior 400 includes steering wheel 402, driver's seat 404, shifter or gear selector 406, dashboard 408 and center console 410. Center console 410 includes an upper portion 412 and a lower portion 414. In some embodiments, lower portion 414 includes radio and/or audio controls. Preferably, upper portion 412 includes display 416. In some embodiments, upper portion 412 includes a multi-function unit that can communicate or control an audio system, a climate control system and/or a navigation system.

In an exemplary embodiment, display 416 is used as display device 326, shown schematically in FIG. 3. Also in the exemplary embodiment, central unit 302 or portions of central unit 302 is disposed behind display 416. In some embodiments, display 416 can include a touch screen and in some embodiments, buttons can be disposed next to display 416.

In one embodiment, central unit 302 includes provisions that allow central unit 302 to act as a hands free telephone system. In this regard, microphone 314 can be placed in a discreet and somewhat hidden location in passenger cabin 126 (see FIG. 1) of motor vehicle 100 (see FIG. 1). Other components are preferably placed out of plain sight.

Figure 5:
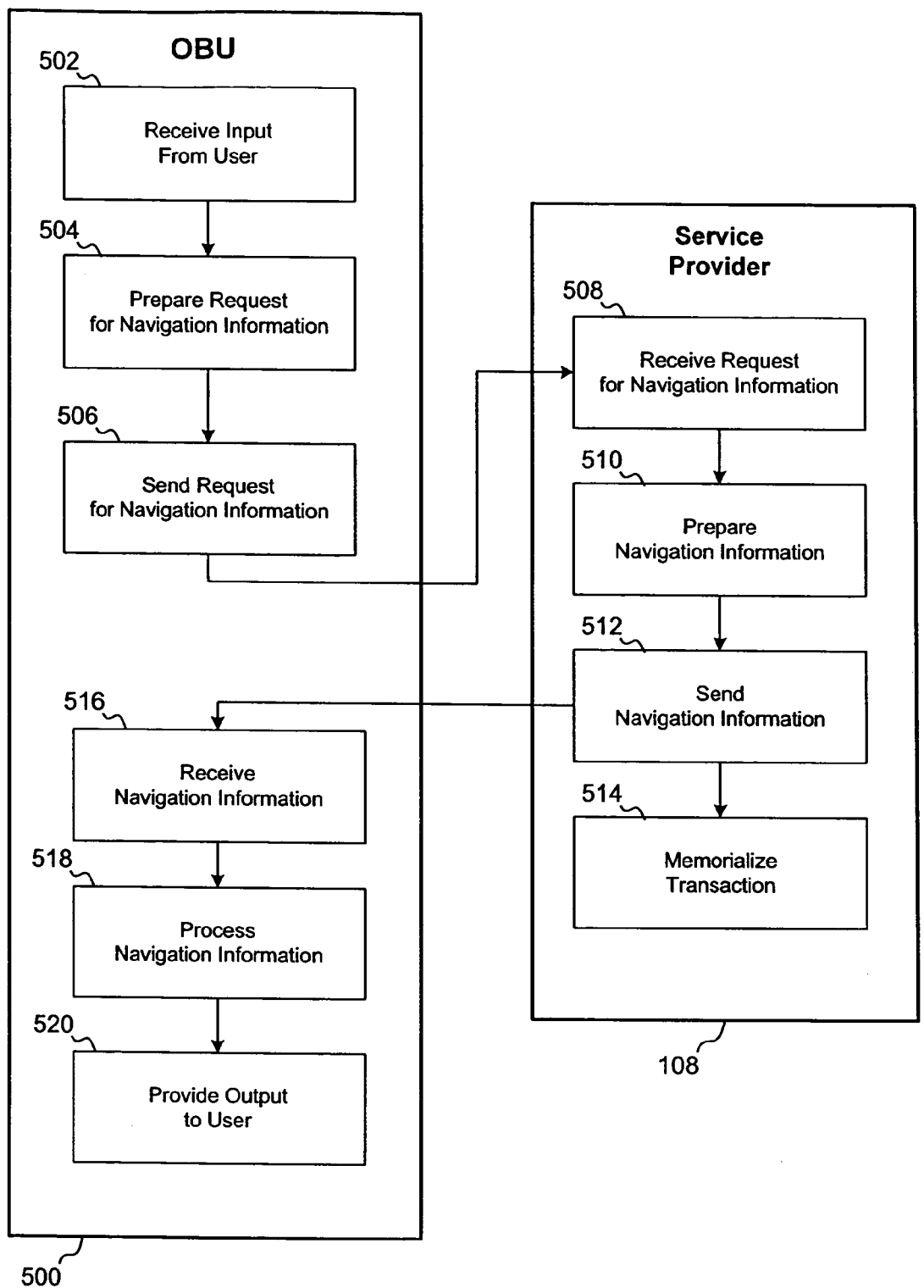
FIG. 5 is a flow diagram of a preferred embodiment of a method for requesting and receiving navigation information.

Some embodiments provide a system and method managing navigation information. FIG. 5 is a flow diagram of a preferred embodiment of a system and method for managing navigation information.

In the embodiment shown in FIG. 5, certain steps are associated with On-Board Unit (referred to as "OBU") 500 and certain steps are associated with service provider 108. Preferably, those steps associated with OBU 500 are performed on or by OBU 500 and those steps associated with service provider 108 are performed on or by service provider 108. However, this is not necessarily the case, and those steps associated with OBU 500 can be performed on or by service provider 108 or some other resource, and those steps associated with service provider 108 can be performed on or by OBU 500 or some other resource.

OBU 500 is a device or provision associated with motor vehicle 100. In some embodiments, OBU 500 includes provisions that permit OBU 500 to receive information. In some embodiments, OBU 500 can store information in a memory or computer readable media. In some embodiments, OBU 500 includes provisions that permit OBU 500 to process information. In some embodiments, OBU 500 includes provisions that permit OBU 500 to display information. In some embodiments, OBU 500 includes provisions that permit OBU 500 to receive information from a user. In some embodiments, OBU 500 includes provisions that permit OBU 500 to receive information from a wireless network. In some embodiments, OBU 500 includes provisions that permit OBU 500 to interact with a user. In some embodiments, OBU 500 includes a combination of two or more of the above provisions.

Different embodiments can include different elements or features. For simplicity, the term, "On-Board Unit" (OBU) is used to refer to those elements or components that are associated with motor vehicle 100 (see FIG. 1) for a particular embodiment. In an exemplary embodiment, OBU 500 comprises one or more facilities of central unit 302 (see FIG. 3). OBU can also include one or more of the items shown in FIG. 3, for example, central unit 302, display 326, and/or input device 330.

Preferably, as shown in FIG. 5, the process begins when an input is received in step 502. Any form of input can be received in step 502. In some cases, the input is in the form of one or more buttons being pressed, and/or interaction with a touch screen associated with display device 326 (see FIG. 3). In some cases, a combination of input from buttons and/or touch screen interaction is received.

It is also possible for voice information to be received in step 502. Any known speech recognition process or program can be utilized to convert spoken words, phrases and/or numbers into a machine readable format. Preferably, the IBM® embedded Via Voice speech recognition engine is used.

In step 504, OBU 500 analyzes and processes the information received in step 502 and prepares a request for navigation information. In step 506, OBU 500 sends a request for navigation information. In step 508, service provider 108 receives a request for navigation information. In step 510, service provider 108 analyzes and processes the request for navigation information and prepares a response to the request. In step 512, service provider 108 sends the requested navigation information to OBU 500.

Step 514 is an optional step. In step 514, service provider memorializes the transaction. In some embodiments, the request is memorialized, in other embodiments, the response is memorialized and in still other embodiments, both the request and the response are memorialized. It is also possible to include time, date and location stamps. This memorialized information can be used to interact with billing system 208 (see FIG. 2).

Figure 15:
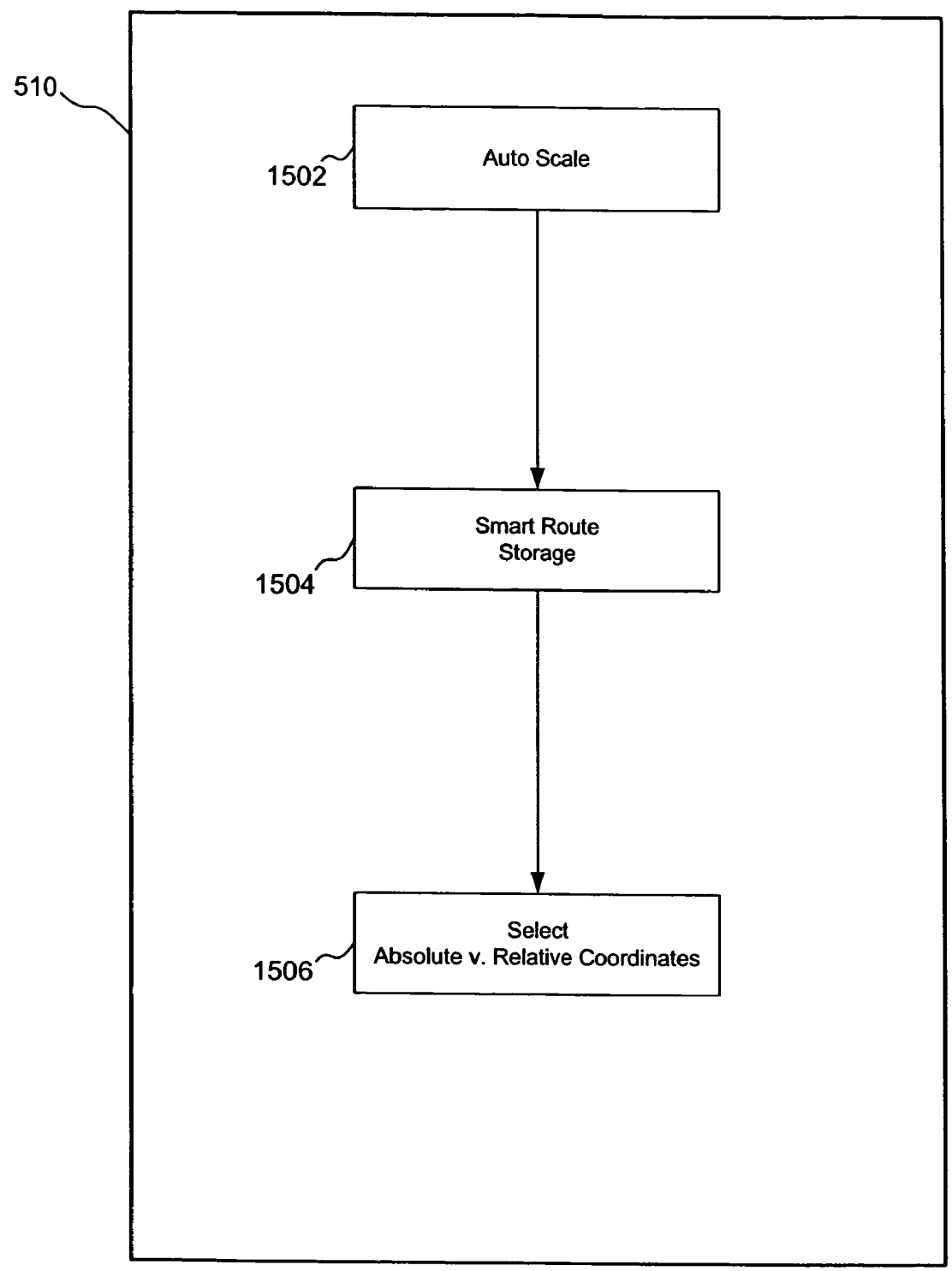
FIG. 15 is a flow diagram of a preferred embodiment of step 510 shown in FIG. 5.

In some embodiments, service provider 108 can prepare navigation information for delivery. Preferably, this preparation step occurs in step 510 after a request for navigation services has been received. One or more different processes or techniques can be used to prepare navigation information for delivery. FIG. 15, which is a flow diagram of a preferred embodiment of step 510, shows several processes that can be used by service provider 108. In the embodiment shown in FIG. 15, some of the processes include auto scale 1502, smart route storage 1504 and select absolute or relative coordinates 1506. In some embodiments, one of the processes is used. In other embodiments, two or more processes are used, and in still other embodiments, all of the processes are used. Furthermore, the various process steps can occur in any desired order.

Figure 6:
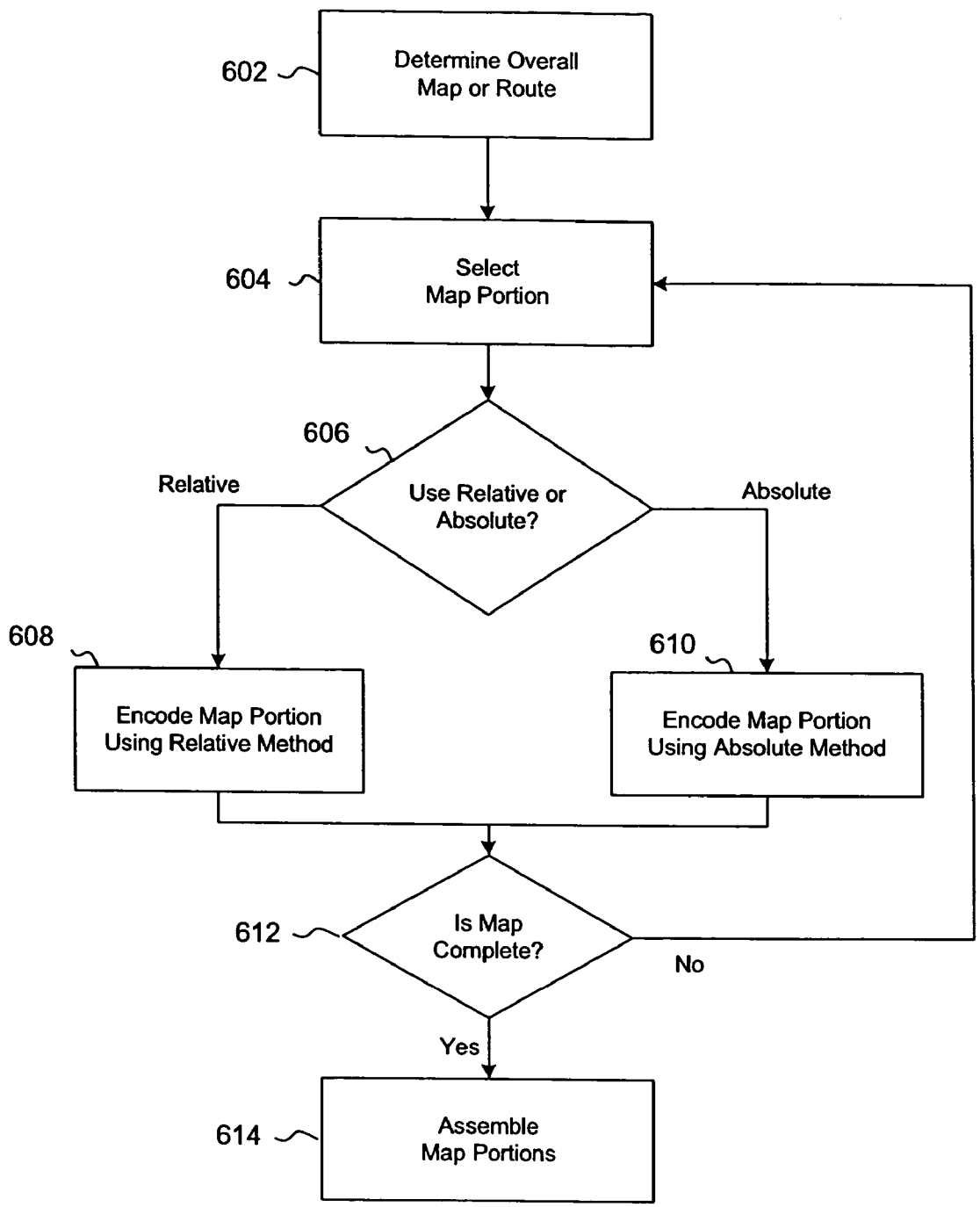
FIG. 6 is a flow diagram of a preferred embodiment of a method for assembling a map.

The process to prepare navigation information 510 can include one or more steps or processes. One of these processes is a process where different elements of a map are encoded or expressed using absolute or relative coordinates. FIG. 6 is a flow diagram of a preferred embodiment of a method for preparing navigation information. This method can be used alone or in conjunction with other methods. Preferably, this process begins with a step 602 of determining an overall map or route. After the overall map or route has been selected, the map or route is preferably divided into two or more smaller portions. Any desired approach can be used to divide the map or route, and one suitable example is shown in FIG. 7.

A particular map portion is selected in step 604. After this map portion has been selected, the process determines which coordinate system, either absolute or relative, will encode or express the various map features associated with the map portion most efficiently. The selection of absolute or relative coordinates is discussed in greater detail below. If a relative coordinate system more efficiently encodes or expresses the information, then a relative coordinate system is used, and the various map features associated with the selected map portion are encoded in relative coordinates 608. On the other hand, if absolute coordinates are more efficient, than the various map features associated with the selected map portion are encoded using absolute coordinates 610.

After the selected map portion has been encoded, the process, in step 612, determines if the map is complete or if there are other map portions left to encode. If the map is incomplete, the process returns to step 604 where another map portion that has yet to be encoded is selected. If the process determines that the map is complete and that all of the map portions have been encoded, the process ends. In some embodiments, the map portions are assembled "on the fly," that is, during the encoding process. In other embodiments, the map portions are encoded and at the very end, all of the various map portions are assembled in step 614.

After the overall map has been determined in step 602, the process shown in FIG. 6, attempts to reduce the overall amount of information that needs to be transmitted. One way to accomplish this reduction in data is to use relative or absolute coordinates to define various objects on a map.

In an absolute coordinate system, each coordinate is expressed independently from other coordinates. The information associated with a particular coordinate is sufficient to define the coordinate on a map or region.

Preferably, an absolute coordinate includes two bytes of data. One byte is used for the value of one axis, and the other byte is used for the value of the other axis. For example, a single absolute coordinate can be expressed as (X1, Y1) where X1 is the x-axis value and Y1 is the y-axis value of the coordinate. Preferably, one byte is used to define X1 and a second byte is used to define Y1. Thus, if absolute coordinates are used, two bytes are used to define each coordinate. If a map were to include two coordinates, then four bytes would be used to the two coordinates. For example, the first coordinate would be (X1, Y1) and the second coordinate would be (X2, Y2). As noted above, two bytes would be used to define X1 and Y1. Two bytes would also be used to define the second coordinate; one byte for X2 and a second byte for Y2. Thus, in this simple example, a total of four bytes would be used to define two coordinates using the absolute coordinate system.

In contrast, relative coordinates preferably use an initial absolute coordinate, and one or more subsequent coordinates that are defined in relation to the initial coordinate. For example, consider a situation where two coordinates are defined using a relative coordinate system. The first coordinate (X3, Y3) would be defined using an absolute coordinate system and the second coordinate, (X4, Y4) would be defined relative to the first coordinate. In a preferred embodiment, the values associated with the second coordinate are expressed as differences or displacements from the first coordinate. In this embodiment, the X-axis value would be X4−X3 or dX and the Y-axis value would be Y4−Y3 or dY. In this example, the first coordinate would be (X3, Y3) and the second coordinate would be expressed as (dX, dY). Preferably, the expression (dX, dY) is encoded as a single byte.

In a preferred embodiment, a portion of the byte is used to express dX and another portion of the byte is used to express dY. In an exemplary embodiment, the byte is divided into two halves, and the first half is used to express dX while the second half is used to express dY. Any suitable byte length can be used. For example, in some cases, a byte comprises eight (8) bits. In this case, in an exemplary embodiment, the first four bits would be used to express dX and the next four bits would be used to express dY. In another example, a byte is comprised of 16 bits. Here, the first eight bits would be used to express dX and the next eight bits would be used to express dY. In other cases, bytes can include 32, 64, 128, 256, 512, 1024 or any other number of bits. Regardless of the size of the byte, the principles of encoding a two axis displacement into a single byte can be applied.

Returning to the simple example, two bytes are required when using an absolute coordinate system while only three bytes are required when using a relative coordinate system. Thus, in this simple example, the relative coordinate system more efficiently encodes the data. There are cases where an absolute coordinate system is advantageous. One example is a long, straight road. The road can be defined by its two end points. In absolute coordinates, the two end points would require four bytes. However, in relative coordinates, many intermediate points may be required. This is because of the limited bit length available for each displacement step. Because of this, a relative coordinate system may require many intermediate points to define the entire road. In sum, both systems have their advantages and disadvantages. There are cases where absolute coordinates more efficiently encode a particular item of navigation information and there are cases where relative coordinates more efficiently express an item of navigation information. Preferably, the more efficient system is selected, as disclosed below.

In some embodiments, the entire map is represented in absolute or relative coordinates. However, in other embodiments, portions of the map are selected and these individual portions are represented in either absolute or relative coordinates. FIG. 7 is schematic diagram of an example of a map 702 that has been divided into regions. As shown in FIG. 7, map 702 includes some regions where absolute coordinates have been used. These regions are symbolized on map 702 with the letter "A." Map 702 also includes regions where relative coordinates have been used. These regions are represented in map 702 with the letter "R."

Preferably, the coordinate system that requires the smallest amount of information to accurately represent the relevant data for that particular region is selected. Thus, if a relative coordinate system requires less information to define the desired map elements or a particular region, then a relative coordinate system is used. On the other hard, if an absolute coordinate system requires less information, then an absolute coordinate system is used.

In some embodiments, individual map features are represented in one coordinate system, while other similar map features are represented using the other coordinate system. A map feature is any item or entity that can appear on a map. Some examples of map features include streets or roads, landmarks, points of interest, parks, commercial areas, parking lots, and geographic features like mountain ranges and bodies of water. FIG. 8 is an example of distinct coordinate systems representing similar map features. Consider, for example, map portion 802, which includes a first road 804 and a second road 806. First road 804 generally extends west to east, while second road 806 generally extends north to south. First and second roads 804 and 806 meet at intersection 808.

In this example, it is assumed that 804 can be represented with less information using a relative coordinate system than if an absolute coordinate system were used. Because of this, a relative coordinate system is used to represent first road 804. In contrast, it is assumed that second road 806 can be represented in absolute coordinates more efficiently, that is, with less data, than with relative coordinates. Thus, absolute coordinates would be selected for second road 806. In this way, similar map features within a particular map region are represented using different coordinate systems.

In some embodiments, different portions of the same map feature can be represented in different coordinate systems. FIG. 9 is a schematic diagram of an example map region 902. Although any map feature can be represented with two different coordinate systems, FIG. 9 provides an example of a road 904 that is represented by two different coordinate systems. Road 904 includes a first portion 906 and a second portion 908. In the example shown in FIG. 9, first portion 906 is more efficiently represented using relative coordinates. That means that first portion 906 can be represented by less information if relative coordinates are used, than if absolute coordinates are used. In contrast, second portion 908 is more efficiently represented in absolute coordinates. Preferably, in order to most efficiently encode road 904, a relative coordinate system is used to represent first portion 906 and an absolute coordinate system is used to represent second portion 908.

In some embodiments, different axes of a single map feature are represented using different coordinate systems. One example of this is a situation where the X-axis of a particular map feature is more efficiently represented using absolute coordinates and the Y-axis of the same map feature is more efficiently represented using relative coordinates. In this case, the X-axis of the map feature can be represented in absolute coordinates while the Y-axis can be represented in relative coordinates.

Some embodiments include provisions to reduce the size of information transmitted from service provider 108 to OBU 500. Although the following procedure can be performed in any step shown in FIG. 5, it is preferred that the following procedure be performed in step 510.

The following procedure reduces the size of information by removing duplicate information. Referring to FIG. 10, which is an example of map with five roads labeled E, F, G, L M and N. Each of the roads are comprised of one or more segments. For example, road E is comprised of segments E1, E2, E3, E4, E5 and E6. Road F is comprised of segments F1, F2, F3, F4, F5, F6, F7, F8 and F9. The other roads are also comprised of various segments as shown in FIG. 10.

Given the map data of FIG. 10, consider an example where a route is plotted. FIG. 11 is a schematic diagram of FIG. 10 with route 1102. Route 1102 includes the following segments: N1, N2, N3, E3, L4, L5, L6 and L7.

In some embodiments, information regarding all of the segments of all of the roads associated with map 1002 is sent and then information related to the segments associated with route 1102. To demonstrate this, reference is made to FIGS. BC and BD. FIG. BC is a schematic diagram of information related to map 1002. Each of the boxes in FIG. BC contains a segment label, and those segment labels represent information used to define the segment. In some cases, each segment is defined by an initial XY coordinate and a final XY coordinate. In other cases, each segment is defined by an initial XY coordinate and a displacement.

Regardless of how each segment is defined, six segments related to road E, nine segments related to road F, five segments related to road G, seven segments related to road L, four segments related to road M and three segments related to road N for a total of thirty four (34) segments are established and prepared for transmission.

After information related to map 1002 has been prepared and/or sent, information related to route 1102 is prepared. As disclosed above and as shown in FIG. 11, example route 1102 includes segments N1, N2, N3, E3, L4, L5, L6 and L7, for a total of eight (8) segments. Information related to the segments associated with route 1102 is then prepared and/or sent. In this example, information related to a total of forty two (42) segments required to define map 1002 and route 1102 on map 1002. This is because thirty four (34) segments are required to define map 1002 and eight (8) segments are required to define route 1102. Adding thirty four (34) and eight (8) yields a total of forty two (42) segments. Schematically, this process can be understood by considering the segments contained in FIG. 12 being transmitted followed by the segments contained in FIG. 13. Notice that the segments used to define route 1102 are redundantly transmitted, first to define map 1002 and then to define route 1102.

It is possible to reduce the number of total segments required to define route 1102 in map 1002. FIG. 14 is a schematic diagram of a preferred embodiment of a method for preparing and/or sending map and route information. In this embodiment, route information is prepared and is established as the first set of information. Map information other than the route information is placed after the route information.

Returning to the examples shown in FIGS. 10 and 11, recall that information associated with route 1102 is expressed as segments: N1, N2, N3, E3, L4, L5, L6 and L7, as shown in FIG. 13. Preferably, this route information is placed or transmitted first. As shown in FIG. 14, which is a schematic diagram of a preferred embodiment of information related to map 1002 and route 1102, information related to route 1102 is placed before other information. Other non-route information is placed after route 1102 information. In some embodiments, a separation character is placed between route 1102 information and other non-route information. In other embodiments, a header is provided before any information is sent. This header can include information regarding the end of route 1102 information and the beginning of other non-route information. In some cases, the header can include the number of segments of route 1102 information. In other cases, the header can include a name, label or other indicia of the last segment of route information.

This results in a total of thirty four (34) segments. Using this technique, the redundancy of expressing and transmitting route information is eliminated, and only 34 segments are required to express map 1002 and route 1102 as opposed to forty two (42) segments.

Figure 16:
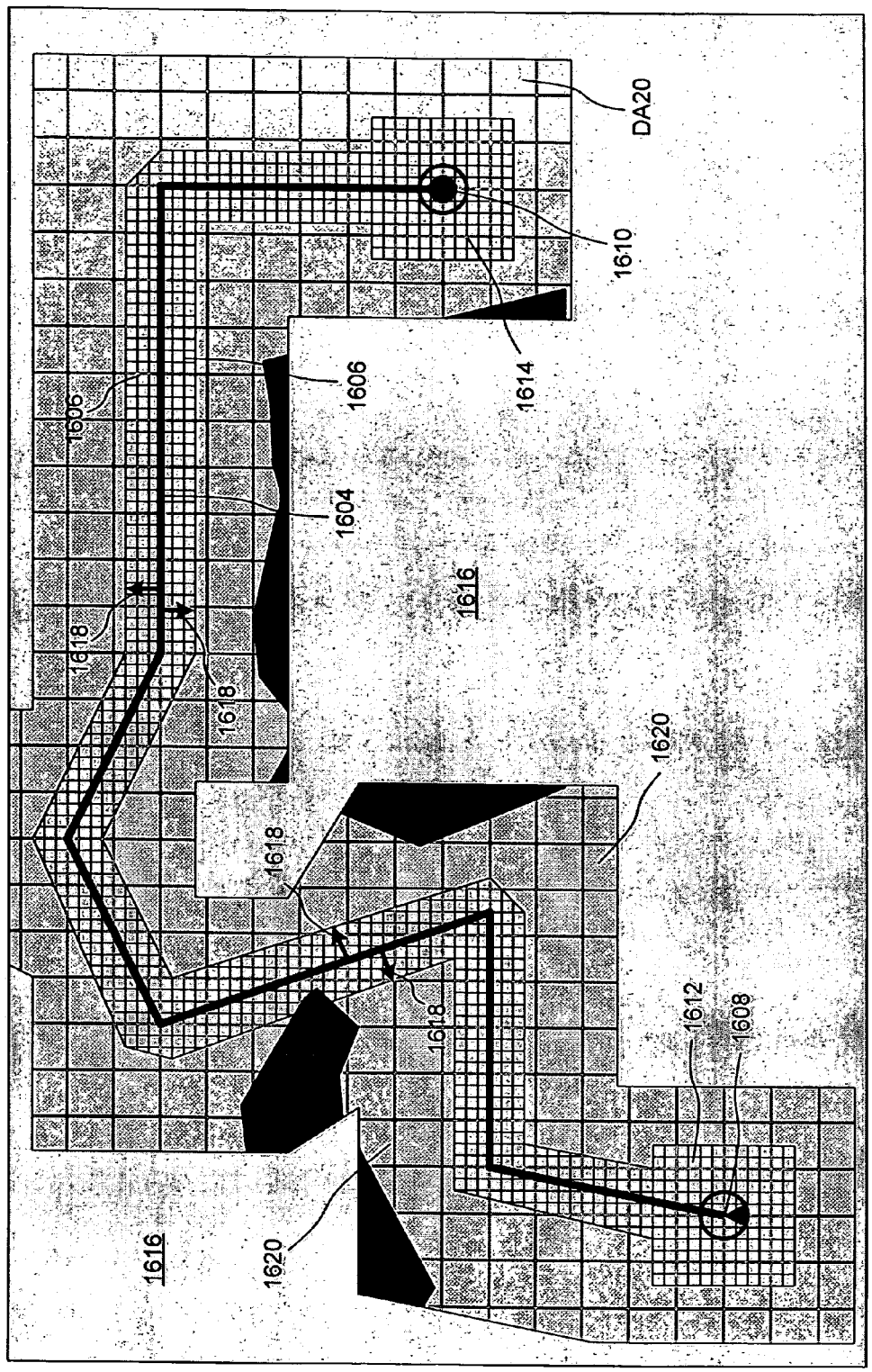
FIG. 16 is a schematic diagram of a preferred embodiment of a map.

In some embodiments, different portions of a map or route are defined using different levels of detail. In some cases, certain regions are defined in greater detail than other regions. Referring to FIG. 16, which is a preferred embodiment of an example map 1602, a route 1604 has been determined. In some embodiments, there are two regions with different levels of detail, in other embodiments, there are three or more regions that have different levels of detail. In the embodiment shown in FIG. 16, there are three regions with different levels of detail.

A first region 1606 proximate route 1604 is encoded or established with a first level of detail. Preferably, this first level of detail accurately portrays many map features, for example, small side streets and roads, detailed information regarding intersections, points of interest, information regarding businesses and other detailed information. In some embodiments, this first level of detail includes full detail or all available information.

First region 1606 can extend a predetermined distance from route 1604. In some cases, first region 1606 extends further away from route 1604 in some places than in other places. Preferably, first region 1606 extends further away from route 1604 at its endpoints than at other portions of route 1604.

Referring to the example in FIG. 16, route 1604 includes a starting point 1608 and an destination point 1610. Starting point 1608 is preferably used to represent the starting point of route 1604, and includes a starting point first region 1612 disposed about starting point 1608. In some cases, like the embodiment shown in FIG. 16, starting point first region 1612 surrounds starting point 1608. In other embodiments, starting point first region 1612 does not completely surround starting point 1608.

Similarly, destination point 1610 is used to represent the destination point of route 1604. Preferably, destination point 1610 includes a destination point first region 1614 disposed about destination point 1610. In some cases, like the embodiment shown in FIG. 16, destination point first region 1614 surrounds destination point 1610. In other embodiments, destination point first region 1614 does not completely surround destination point 1610.

Starting point 1608 and destination point 1610 can be referred to as end points. End points are disposed at outer ends of a given route. Preferably, the size of first region 1606 is different near the end points than for other points along route 1604. End point first regions can also have different shapes than the shape of first region 1606 along route 1604.

Figure 18:
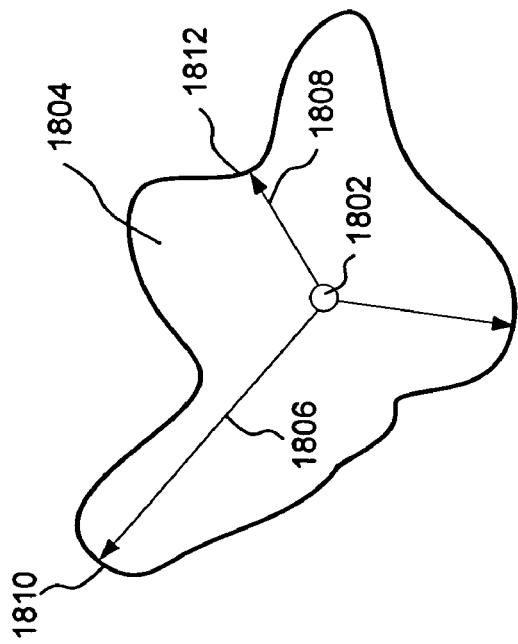
FIG. 18 is a schematic diagram of a generalized embodiment of an end point first region.
Figure 17:
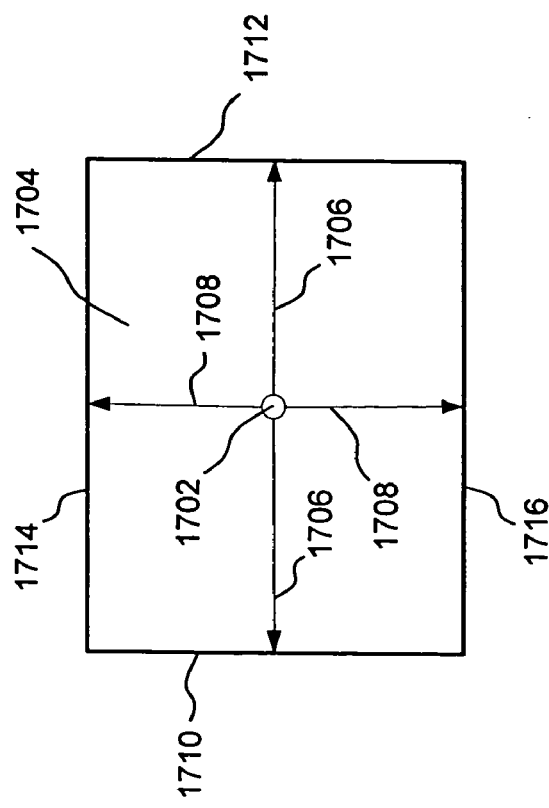
FIG. 17 is a schematic diagram of a preferred embodiment of an end point first region.

FIGS. 17 and 18 are schematic diagrams of embodiments of end point first regions. The embodiments of end points shown in FIGS. 17 and 18 can be applied to ether starting point 1608 or destination point 1610 or both. An end point 1702 can be seen in FIG. 17, along with a preferred embodiment of an destination point first region 1704 associated with end point 1702. Although any arbitrary shape can be selected and used as end point first region 1702, the box shape shown in FIG. 17 is preferred.

As shown in FIG. 17, end point first region 1704 includes a boundary comprising first side 1710, second side 1712, third side 1714 and forth side 1716. Although the sides can assume any desired orientation, preferably, first and second sides 1710 and 1712, respectively, are preferably disposed on either side of end point 1702 and third and fourth sides 1714 and 1716, respectively, are disposed above and below end point 1702. In some embodiments, first side 1710 and second side 1712 are vertical, in other embodiments, they are angled, curved or irregular. In some embodiments, third side 1714 and fourth side 1716 are horizontal, in other embodiments, they are angled, curved or irregular.

In the embodiment shown in FIG. 17, First side 1710 is spaced from end point 1702 a distance of about 1706 and second side is also spaced a distance of about 1706 from end point 1702. Third side 1714 is spaced from end point 1702 a distance of about 1708 and fourth side 1716 is spaced from end point 1702 a distance of about 1708. This provides an end point first region 1704 having dimensions 2*1706 X 2*1708, where 1706 and 1708 are not literal distance dimensions or lengths, but rather represent the respective distances between a side and end point 1702. In some embodiments, end point 1702 is roughly centered within end point first region 1704, in other embodiments, end point 1702 is disposed at a location that is not centered about end point first region 1704. Referring to FIGS. 16 and 17, the principles and characteristics of end point first region 1704 can be applied to either starting point first region DA12 or destination point first region 1614 or both.

FIG. 18 shows another embodiment of an end point first region 1804 and its associated end point 1802. In this embodiment, end point first region 1804 has a generalized shape. Different portions of end point first region 1804 are spaced different distances from end point 1802 than other portions. For example, first portion 1810 is spaced from end point 1802 by a distance of about 1806 and second portion 1812 is spaced from end point 1802 by a distance of about 1808.

Referring to FIGS. 16 and 18, the principles and characteristics of end point first region 1804 can be applied to either starting point first region 1612 or destination point first region 1614 or both.

Referring to FIGS. 16 to 18, a comparison can be made between the extent or relative size of the first region 1606 associated with route 1604 and the first region associated with an end point. In a preferred embodiment, the relative size of a portion of the first region associated with an end point is larger than the size of a first region associated with route 1604. In some cases, a portion of the first region associated with an end point is larger than the first region associated with a route, while other portions of the first region associated with an end point are smaller than the first region associated with a route. In other cases, the size of the first region associated with an end point is larger in every direction than the size of the first region associated with a route. These features can be observed with reference to the Figures.

Referring to FIGS. 16 to 18, the relative sizes of first region 1606 associated with route 1604, starting point first region 1612 and destination point first region 1614 are considered. First region 1606 generally extends in a distance normal or perpendicular to route 1604. As route 1604 bends and turns, first region 1606 follows this meandering path and the outer boundaries of first region 1606 generally remain parallel to route 1604 on either side. As shown in FIG. 16, the boundaries of first region 1606 can be truncated, cut, or otherwise modified around turns. These modifications can be made to facilitate rapid computation of the size and boundary of first region 1606, or these modifications can be made when an approximation, as opposed to an exact distance, is desired. Given these variations, portions of first region 1606 extend a distance 1618 away from route 1604. It is possible for some portions of first region 1606 to extend further away from route 1604 than distance 1618, and it is also possible for some other portions of first region 1606 to remain closer to route 1604 than distance 1618. This is particularly true at bends or curves, but these variations can also occur on straight portions of route 1604 as well.

Distance 1618, which is the perpendicular distance from route 1604 to an outer boundary of first route 1606 along a portion of first route 1606, can be used to determine the relative general width of a portion of first region 1606. Preferably, first region 1606 extends in roughly equal distances on one side of route 1604 as on the other side. Although these distances can vary, equal distances are generally preferred. Given this arrangement, the width of first region 1606 is approximately twice distance 1618 or 2*(1618), where 1618 is not a literal number or length measurement, but a representation of the distance from route 1604 to the outer boundary of first region 1606, as shown in FIG. 16.

The width of first region 1606 can be compared with the size of a first region associated with an end point. In some embodiments, starting point first region 1612 has the characteristics of end point first region 1704 as shown in FIG. 17. In this example, end point first region 1704 includes first and second sides 1710 and 1712. These sides are spaced a distance 1706 from end point 1702. In some embodiments, the distance 1706 from end point 1702 to first side 1710 is greater than the distance 1618 between route 1604 and an outer boundary of first region 1606.

End point first region 1704 also includes third and fourth sides 1714 and 1716, respectively. The distance between these sides and end point 1703 is 1708. In some embodiments, the distance 1708 from end point 1702 to third side 1714 is greater than the distance 1618 between route 1604 and an outer boundary of first region 1606.

When distance 1706 and 1708 are both considered and compared with distance 1618, other embodiments can be observed. In some embodiments, distance 1706 is roughly equal to distance 1708. This provides a generally square shaped end point first region 1704. In other embodiments, the distance 1706 is not equal to distance 1708, resulting in a rectangular end point first region 1704. In some embodiments, both distances 1706 and 1708 are greater than distance 1618. In other embodiments, one of the distances 1706 or 1708 is greater than distance 1618, while the other distance is less than distance 1618. In some alternative embodiments, distance 1618 is greater than either distance 1706 or 1708. In a preferred embodiment, both distances 1706 and 1708 are greater than distance 1618.

FIG. 18 shows another embodiment of an end point 1802 and its associated end point first region 1804, as disclosed above. Recall that end point first region 1802 includes a first portion 1810 that is spaced a distance 1806 from end point 1802 and a second portion 1812 that is spaced a distance 1808 from end point 1802.

These distances 1810 and 1812, can be compared with distance 1618. In some embodiments, both distances 1810 and 1812 are greater than distance 1618. In other embodiments, one of the distances 1810 or 1812 is greater than distance 1618, while the other distance is less than distance 1618. In some alternative embodiments, distance 1618 is greater than either distance 1810 or 1812.

In addition to a first region, some embodiments also include a second region 1620. Preferably, second region 1620 includes less detail than first region 1606. In some embodiments, this means that at least one item or class of navigation information is omitted from second region 1620 as compared to first region 1606. For example, small side streets, one class or type of navigation information, may be omitted in second region 1620 but may be represented in first region 1606. Business names could be another example. First region 1606 may represent or include certain business names, while second region 1620 omits these items of navigation information. In a preferred embodiment, second region 1620 includes major arteries, like interstate highways, major geographic features, like major bodies of water, and other major or significant features like bridges, national parks, airports, and major political subdivisions, like state lines and city limits.

In addition to first region 1606 and second region 1620, some embodiments include a third region 1616. Preferably, third region 1616 includes all areas or portions of map 1602 that is not defined by any other portion. In the embodiment shown in FIG. 16, third region 1616 includes portions of map 1602 that is not described or defined by first region 1606 or second region 1620. Preferably, third region 1616 includes less detail than second region 1620. Again, items or classes of navigation information can be omitted in third region 1616 that is described in second region 1620. In a preferred embodiment, third region 1616 includes no navigation information.

This process formats and prepares navigation information for efficient transmission. Information far from a desired route is simplified or eliminated and information near the desired route is provided in greater detail. Essential and useful information near the route is retained, while information far from the route is simplified or condensed. In this way, essential and useful information is made available, while information that is not likely to be used is discarded or simplified.

Navigation information can also be transmitted in a way to improve the availability of the navigation information and to provide useful information more quickly to a user. In one embodiment, this is accomplished by sending the navigation information in a particular order.

FIGS. 19 to 22 are flow diagrams of various different embodiments showing different ways to transmit navigation information to an OBU. Referring to FIGS. 5, 16 and 19 to 22, there are preferably four discreet sets of data that are sent from service provider 108 to OBU 500. These four sets of data include: "Entire Route Map," "Detail of Starting Point," "Detail of Destination Point," and "Detail Along Route."

In a preferred embodiment, "Entire Route Map," refers to information related to route 1604. This information can be used to define route 1604. "Detail of Starting Point" refers to information related to starting point first region 1612. This information provides details of the area near starting point 1608. Similarly, "Detail of Destination Point" provides information related to destination point first region 1614. This information provides details of the area near destination point 1610. "Detail Along Route" provides information related to first region 1606 associated with route 1604. Preferably, these four discreet items of data are sent in a predetermined order.

Figure 19:
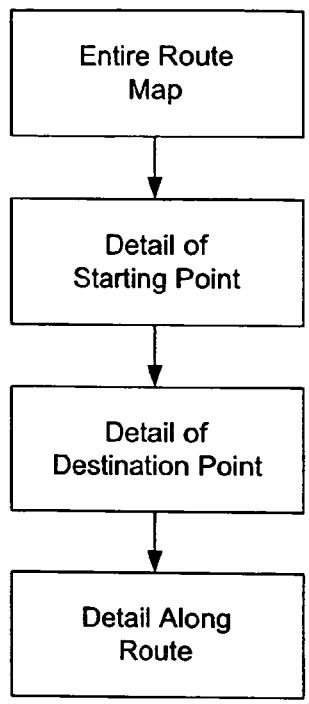
FIG. 19 is a flow diagram of a preferred embodiment of a prioritized order of transmission of navigation information.

In the embodiment shown in FIG. 19, Entire Route Map is transmitted first, then Detail of Starting Point, then Detail of Destination Point and finally, Detail Along Route. In this embodiment, the intent is to allow the user to commence the journey as soon as possible. Thus, the Entire Route Map, which would include directions along the route, is transmitted first. In some cases, this allows the user to begin driving without having to wait until all of the information is sent to the OBU.

Figure 20:
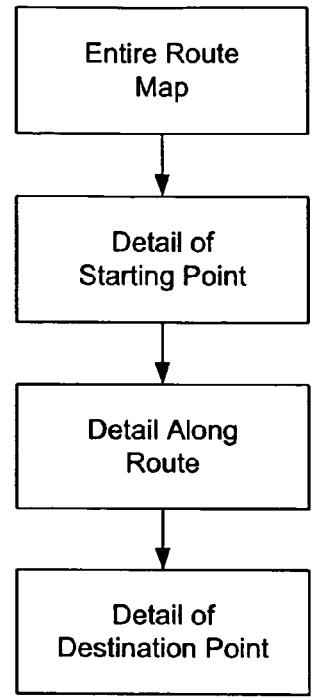
FIG. 20 is a flow diagram of an alternative embodiment of a prioritized order of transmission of navigation information.

In the embodiment shown in FIG. 20, Entire Route Map is transmitted first, then Detail of Starting Point, then Detail Along Route, and finally, Detail of Destination Point. This embodiment is similar to the embodiment shown in FIG. 19 except the last two steps are reversed. This embodiment can be used when the user is familiar with the destination point and it would be more helpful to the user to receive details along the route before details of the destination are received.

Figure 21:
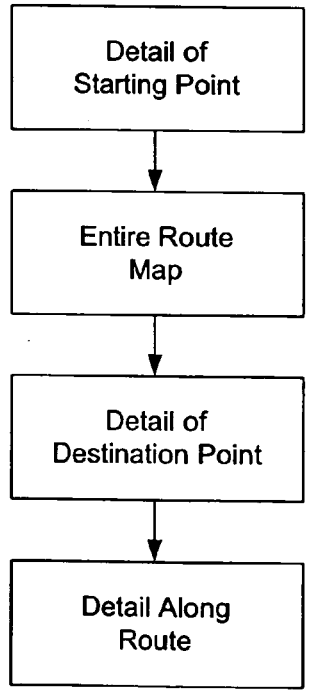
FIG. 21 is a flow diagram of an alternative embodiment of a prioritized order of transmission of navigation information.

In the embodiment shown in FIG. 21, Detail of Starting Point, is transmitted first, then Entire Route Map, then Detail of Destination Point and finally, Detail Along Route. This embodiment can be used when the user is unfamiliar with the current surroundings and the current starting point. Details of the starting point may be helpful in assisting the user in finding the route. In this case, details of the starting point would be the most helpful information and would help the user to commence the journey as soon as possible.

Figure 22:
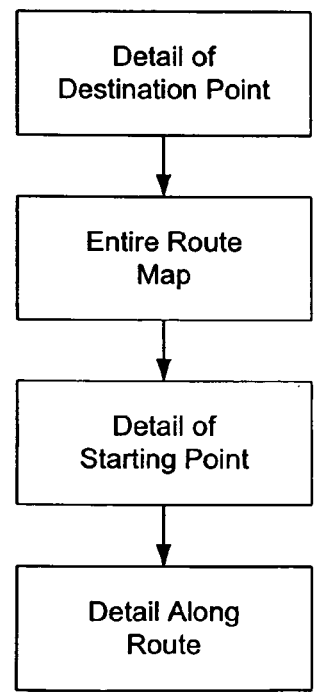
FIG. 22 is a flow diagram of an alternative embodiment of a prioritized order of transmission of navigation information.

In the embodiment shown in FIG. 22, Detail of Destination Point, is transmitted first, then Entire Route Map, then Detail of Starting Point and finally, Detail Along Route. This embodiment can be used when the user is unfamiliar with the destination point and wants to confirm that the navigation information is correct and is likely to provide correct driving directions. In these instances, details of the destination would be the most helpful information for the user to receive first.

The above embodiments are exemplary. Clearly other embodiments are also possible, and the order of delivery can be adjusted or selected to suit a particular need or situation. Referring to FIGS. 19 to 22 and FIG. 5, preferably, the various embodiments showing different transmission sequences for the four types of data occur in step 512 where navigation information is sent from service provider 108 to OBU 500.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A method for preparing navigation information comprising the steps of:
   receiving a request for navigation information;
   gathering information related to a route between a starting point and a destination point;
   establishing a first region having a first level of detail;
   establishing a second region having a second level of detail;
   wherein the first level of detail is different than the second level of detail; and
   wherein the first region and the second region are used to create map information configured to produce a map displaying the first region together with the second region.

2. The method according to claim 1, wherein the first level of detail is greater than the second level of detail.

3. The method according to claim 1, wherein a third region is established, the third region having a third level of detail different than the first level of detail and the second level of detail.

4. The method according to claim 3, wherein the third level of detail is less than the second level of detail.

5. The method according to claim 3, wherein the third level of detail omits all details.

6. The method according to claim 1, wherein the first level of detail includes all available details.

7. The method according to claim 1, wherein the first region is established proximate the route.

8. A method for preparing navigation information comprising the steps of:
   receiving a request for navigation information;
   gathering information related to a route between a starting point and a destination point;
   establishing a route first region associated with the route, having a first level of detail, and having a portion extending a first distance from the route;
   establishing an end point first region associated with an end point, having the first level of detail, and extending a second distance from the end point; and
   wherein the first distance is less than the second distance.

9. The method according to claim 8, wherein the end point is a starting point.

10. The method according to claim 8, wherein the end point is a destination point.

11. The method according to claim 8, wherein the end point first region includes a second portion, the second portion extending a third distance from the end point, and wherein the first distance is less than the third distance.

12. The method according to claim 8, wherein the end point first region includes a second portion, the second portion extending a third distance from the end point, and wherein the first distance is greater than the third distance.

13. The method according to claim 8, wherein the first portion is established proximate the route.

14. A method for preparing navigation information comprising the steps of:
   establishing a first region, a second region and a third region;
   wherein the first region includes more detailed navigation information than the second region and wherein the second region includes more detailed navigation information than the third region;
   wherein a route is located closer to the first region than the second region; and
   wherein the first region, the second region, the third region and the route are used to create map information configured to produce a map displaying the first region, the second region, the third region and the route together on the map.

15. The method according to claim 14, wherein the first region is disposed outward of the route.

16. The method according to claim 15, wherein the first region surrounds the route.

17. The method according to claim 14, wherein the second region is disposed outward of the first region.

18. The method according to claim 17, wherein the second region surrounds the first region.

19. The method according to claim 14, wherein the third region is disposed outward of the second region.

20. The method according to claim 19, wherein the third region surrounds the second region.

21. A method for displaying navigation information comprising the steps of:
   receiving navigation information including:
   first information related to a first region having a first level of detail;
   second information related to a second region having a second level of detail;
   wherein the first level of detail is different than the second level of detail and
   wherein the first information and the second information are used to display a map showing both the first region and the second region together.

22. The method according to claim 21, Wherein the first level of detail is greater than the second level of detail.

23. The method according to claim 21, wherein a third region is established, the third region having a third level of detail different than the first level of detail and the second level of detail.

24. The method according to claim 21, wherein the first region is established proximate the route.

25. A method for displaying navigation information comprising the steps of:
   receiving navigation information including a route first region associated with the route, having a first level of detail, and having a portion extending a first distance from the route;
   the navigation information also including an end point first region associated with an end point, having the first level of detail, and extending a second distance from the end point;
   wherein the first distance is less than the second distance; and
   displaying a map showing the route first region and the end, point first region, 26. The method according to claim 25, wherein the end point is a starting point.

27. The method according to claim 25, wherein the end point is a destination point.

28. The method according to claim 25, wherein the end point first region includes a second portion, the second portion extending a third distance from the end point, and wherein the first distance is less than the third distance.

29. The method according to claim 25, wherein the end point first region includes a second portion, the second portion extending a third distance from the end point, and wherein the first distance is greater then the third distance.

30. The method according to claim 25, wherein the first portion is established proximate the route.

31. A method for displaying navigation information comprising the steps of:
   receiving navigation information including a first region, a second region and a third region;
   wherein the first region includes more detailed navigation information than the second region and wherein the second region includes more detailed navigation information than the third region;
   wherein a route is located closer to the first region than the second region; and
   displaying a map including the first region, the second region, the third region and the route together on the map.

32. The method according to claim 31, wherein the first region surrounds the route.

33. The method according to claim 32, wherein the second region is disposed outward of the first region.

34. The method according to claim 33, wherein the second region surrounds the first region.

35. The method according to claim 31, wherein the third region is disposed outward of the second region.

* * * * *